Jan. 8, 1952  H. R. CRUSE  2,581,578
TRACTION DEVICE
Filed Feb. 6, 1948  2 SHEETS—SHEET 1

INVENTOR.
HENRY R. CRUSE
BY
Busser + Harding
ATTORNEYS

Jan. 8, 1952          H. R. CRUSE          2,581,578

TRACTION DEVICE

Filed Feb. 6, 1948          2 SHEETS—SHEET 2

INVENTOR.
HENRY R. CRUSE
BY
*Busser + Harding*
ATTORNEYS

Patented Jan. 8, 1952

2,581,578

UNITED STATES PATENT OFFICE 2,581,578

TRACTION DEVICE

Henry R. Cruse, Gwynedd Valley, Pa.

Application February 6, 1948, Serial No. 6,600

1 Claim. (Cl. 152—217)

This invention relates to an improvement in traction devices adapted to be clamped to the tire of an automobile wheel.

One of the objects of my invention is the provision of a traction device having three arms, each having a tire embracing member at the end thereof, and a centrally disposed arm supporting disc for the other ends of the arms, which can be applied to the tire on the wheel when resting on the roadway and locked in position without moving the wheel, as well as removed therefrom without the use of a tool or a jack for raising the wheel from the roadway.

Another object of my invention is the provision of a device of this character so arranged that the arms can readily be separated from each other so as to be carried in a collapsed condition and can readily be connected for mounting without the use of tools.

Another object of my invention is the provision of a central supporting member or disc to which two of the arms can be connected approximately 120° apart, then mounted in position on the tire, the third arm is then mounted on the tire 120° from each of the others and engaged with a clamping member associated with the disc whereby the three tire embracing members are simultaneously drawn radially to lock the arms relative to each other.

Another object of my invention is the provision of a clamping member associated with the last mentioned arm and the center disc having a clamping lever pivoted to the disc and a tension member provided with a hook on one end adapted for engaging one of several openings in the end of the third arm, the other end of the lever being pivotally connected to the disc in such a manner that when the hook on the end of the tension member is positioned in an opening in the third arm, the pivotal connection between the tension member is on one side of the pivot pin connecting the clamping lever to the disc, and when the lever is shifted to place the pivot between the tension member and the clamping member on the other side of the pivot of the lever, the tension member will clamp the arms in position on the tire.

Having now described, in a general way, the nature and purpose of this invention, I will proceed for illustrative purposes to a detailed description of a preferred embodiment thereof with reference to the accompanying drawings, in which:

Figure 1:
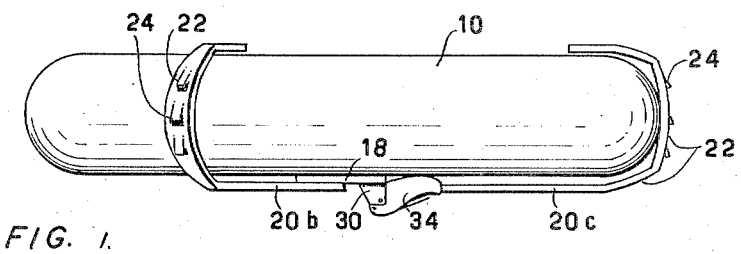
Fig. 1 is a plan view of a wheel with one of my traction devices connected thereto.

Referring to the drawings, the reference character 10 designates the tire mounted on a tire rim 12, which, in turn, is mounted on a rim 14 of a disc wheel 16.

Mounted on the tire 10 is a traction device in accordance with my invention comprising a supporting disc 18 which is substantially central of the wheel 16 and three arms 20$^a$, 20$^b$ and 20$^c$ extending radially from the disc 18, the outer end of each being provided with a hook-like tire embracing member 22, the tread face of which may be provided with spurs or cleats such as shown at 24, in which the tread surface is provided with spurs 24 pressed from the body of the member 22, whose engaging faces 24$^a$ extend towards the outside of the tire to prevent skidding.

In the form shown the arm 20$^a$ is fixedly connected to the disc 18, arm 20$^b$ is connected to the disc, or arm supporting body, by means of a hook 26 which extends through a slot 28 in the disc 18. It will be apparent that the inner ends of both arms 20$^a$ and 20$^b$ may be connected to each other by means of a central member such as the disc 18 or both of said arms may be connected to the disc 18 by means of a hook and eye connection in a manner similar to the connection of the arm 20$^b$.

The arms 20$^b$ and 20$^b$ extend radially from the center of the disc 18 at an angle of 120° from each other. Extending outwardly on opposite sides of a center line drawn radially 120° from each of the arms 20$^a$ and 20$^b$ are bearing members 30 and pivotally connected at 32 to the bearing member 30 is a U-shaped clamping lever 34. Pivotally mounted between the ends of the legs of the clamping lever 34 at 36 is one end of a tension member 38. The other end of the tension member is provided with a hook 40.

The ends of the legs of the clamping lever at the pivotal points between the bearing members 30 and the tension member 38 are somewhat closer to each other than the portions between the bearing members and the connecting cross bar 42, which are spaced a sufficient distance from each other for the reception of the third arm 20c. The ends of the arms at opposite sides of the cross bar 42 are each provided with a lug 44 adapted to engage the sides of the arm 20c when clamped in position on a tire. The inner end of the arm 20c is provided with a plurality of slots 46 as clearly shown in Fig. 3.

Figure 2:
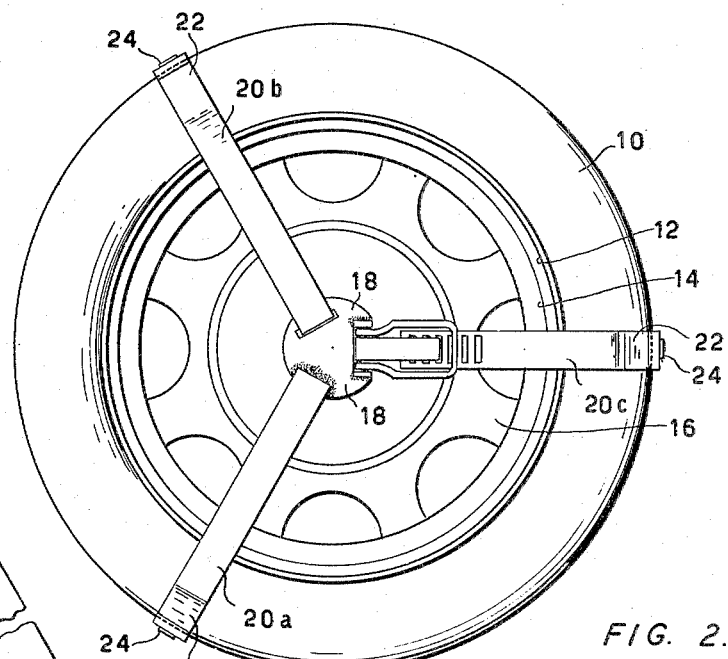
Fig. 2 is a side elevation thereof.
Figure 3:
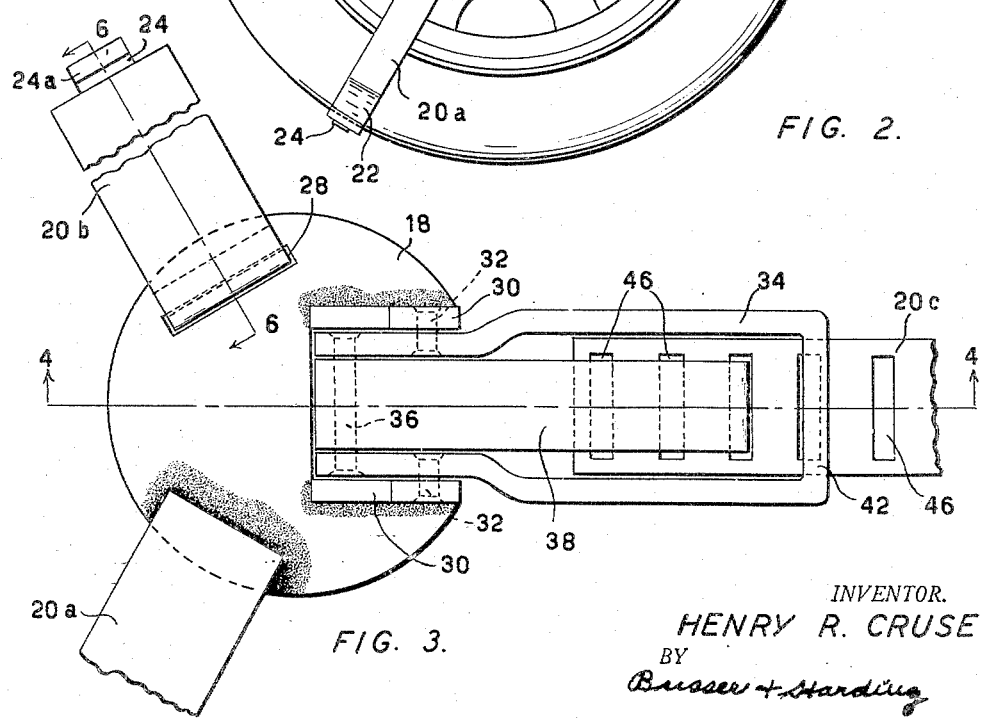
Fig. 3 is a face view of the means for connecting the arms to each other.
Figure 4:
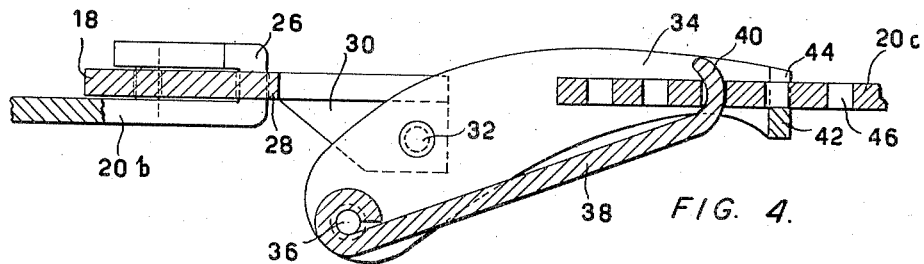
Fig. 4 is a sectional view on the line 4—4 of Fig. 3.
Figure 5:
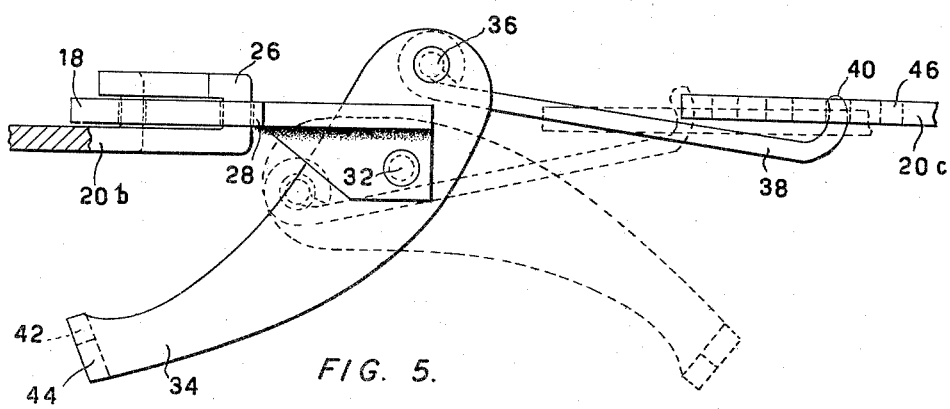
Fig. 5 is a view similar to Fig. 4 with the clamping lever in its unclamped position.
Figure 6:
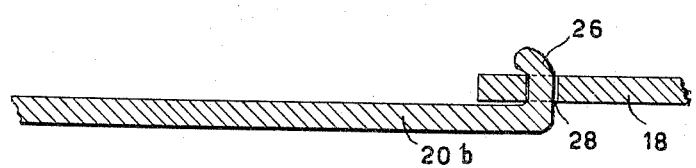
Fig. 6 is a sectional view on the line 6—6 of Fig. 3.
Figure 7:
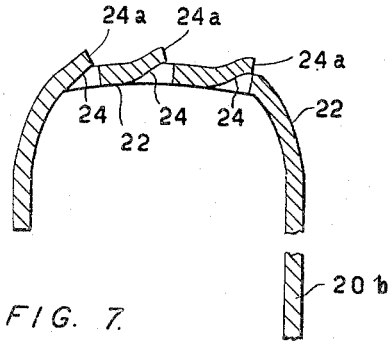
Fig. 7 is a sectional view through the embracing member at the end of arm 20$^b$.

When applying a device such as illustrated in the drawings, the hook 26 of the arm 20b is engaged with the eye 28 and when connected the arms 20a and 20b will extend at an angle of 120° from each other and preferably applied to the tire as shown in Fig. 2. The clamping lever 34 is then drawn outwardly to its open position as shown in Fig. 5 and the arm 20c is then positioned on the tire in parallel relation with the clamping lever 34, the clamping lever is moved towards the arm and the hook 40 is engaged in the proper slot 46. The clamping lever is then moved into locking position as shown in Figs. 3 and 4 with cross bar 42 in contact with the arm 20c while the legs of the clamping lever straddle the arm which is engaged by the lugs 44 on the legs of the clamping lever.

When the device is removed for storage, the arm 20b is unhooked from the disc or arm supporting body 18, the tension member is unhooked from the arm 20c and folded over the top of the arm-supporting body 18, while the clamp 34 is folded under the arm-supporting body so that the device is separated into three compact members which can readily be assembled when it is desired to apply the device to a wheel.

One of the advantages of my invention results from the provision of a three armed traction device for tired vehicle wheels arranged to be separated when stored and to be rigidly connected in angular relation to each other when mounted on a wheel.

Another advantage results from the provision of a three armed traction device, the outer end of each arm being provided with a traction member embracing the tire, the inner ends of two of the arms being provided with means for fixedly connecting the arms at a predetermined angular relation to each other when placed on the wheel, whereby said arms are supported while connecting the third arm in clamping position with the wheel after which the clamp is set to rigidly connect the three arms in fixed angular relation to each other.

It will be evident that variations of the invention may be made without departing from the principle thereof as defined in the appended claim.

What I claim and desire to protect by Letters Patent is:

A traction device adapted to be applied to a tire on a wheel comprising an arm-supporting member, a first arm connected at one end thereof to said arm-supporting member and extending radially therefrom, said arm having a tire-engaging portion at the other end thereof, a slot in the arm-supporting member spaced substantially 120 degrees from said first arm, a second arm having a tire-engaging portion on one end thereof and having a hook on the other end thereof, said hook engaging said slot, a pair of bearings extending from said arm-supporting member, a U-shaped clamping member pivotally connected between said bearings and extending radially substantially 120 degrees from said first and second arms, a tension member pivotally connected to the clamping member and having a hook thereon, and a third arm having a tire-engaging portion on one end thereof and a plurality of slots adjacent the other end thereof for engagement by said hook on said tension member.

HENRY R. CRUSE.

REFERENCES CITED

The following references are of record in the file of this patent:

UNITED STATES PATENTS

| Number | Name | Date |
| --- | --- | --- |
| 1,421,452 | Gerosa | July 4, 1922 |
| 1,882,376 | Weber | Oct. 11, 1932 |
| 2,174,345 | Worthing | Sept. 26, 1939 |